No. 793,802.

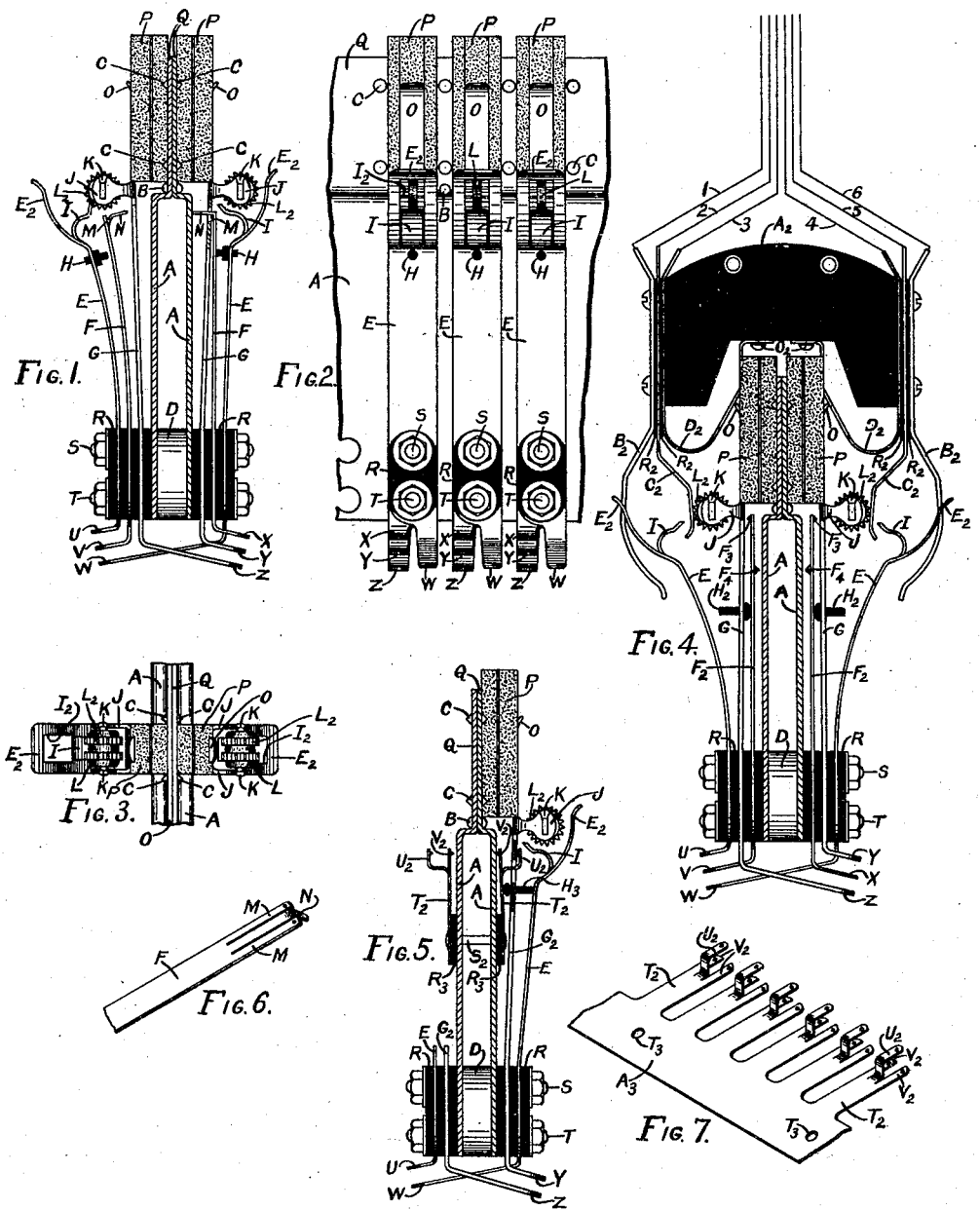

Patented July 4, 1905.

UNITED STATES PATENT OFFICE.

FREDERICK R. PARKER, OF CHICAGO, ILLINOIS, ASSIGNOR TO FRANK B. COOK, OF CHICAGO, ILLINOIS.

ELECTRIC PROTECTIVE APPARATUS.

SPECIFICATION forming part of Letters Patent No. 793,802, dated July 4, 1905.

Application filed July 9, 1904. Serial No. 215,933.

*To all whom it may concern:*

Be it known that I, FREDERICK R. PARKER, a citizen of the United States, residing at Chicago, in the county of Cook and State of Illinois, have invented new and useful Improvements in Electric Protective Apparatus, of which the following is a full, clear, concise, and exact description, reference being had to the accompanying drawings, forming a part of this specification.

My invention relates to apparatus used in connection with protective devices for electric circuits, my object being, first, to simplify such apparatus; second, to provide improved means for testing the protective devices and circuits through the apparatus without removing any of the protective devices from their operative positions; third, to provide an improved arrangement for closing an alarm-circuit when a protective device operates; fourth, to provide improved means for transposing certain connection-terminals to respective opposite sides of the supporting-plate, and, fifth, to provide an economical, efficient, and durable construction in such apparatus which may be readily and cheaply manufactured.

The apparatus of this invention is for the purpose of supporting and operating two classes of electric protective devices—namely, those which protect electrical circuits and apparatus from high-tension electric discharges, such as lightning, and those which protect said circuits and apparatus from small "sneak-currents." The high-tension electric discharges are guarded against by means of lightning-arresters, preferably consisting of carbon blocks with interposed dielectrics, and the sneak-currents are guarded against by means of heat-coils or thermal protectors.

This apparatus comprises spring-supports provided with suitable contacts and arranged for holding the lightning-arresters and heat-coils, the said springs being suitably mounted on a plate which is preferably secured to an iron supporting-frame and conductively connected to earth. When this apparatus is used in connection with telephone systems to provide protection therefor, the said springs form terminals for the lines, switchboard, and alarm circuits. When a thermal protector operates, it throws a ground on certain springs of the combination and controls an alarm-circuit and a switchboard-circuit.

I also provide a testing-plug, to be used in connection with the protective apparatus, the said plug being provided with spring-contact members adapted to engage the respective springs of the protective apparatus for testing the several circuits through the latter.

I will now describe my invention in detail by reference to the accompanying sheet of drawings, illustrating same, in which—

Figure 1 is a plan view of one form of the invention, showing similar parts upon opposite sides of a center line, the apparatus being in duplicate and for a metallic circuit. Fig. 2 is a side view of Fig. 1, showing several sets of the protective apparatus mounted side by side. Fig. 3 is a top end view of Fig. 1, showing one set of the protective apparatus. Fig. 4 is a view of the protective apparatus, taken the same as Fig. 1, showing a testing-plug connected therewith for testing purposes and another arrangement for controlling the alarm-circuit. Fig. 5 is a view of still another arrangement for controlling the alarm-circuit, taken the same as Fig. 1, with a small portion shown in cross-section. Fig. 6 is a perspective view of a portion of the alarm-spring of Fig. 1, and Fig. 7 is a perspective view of the common alarm-strip of Fig. 5.

Like characters refer to like parts in the several figures.

The supporting-plate, upon which the protective apparatus is mounted, is composed of two metallic strips A A, preferably of brass, preferably riveted together at B and formed substantially as shown. Each strip A is provided with projecting points C C thereon, formed out of the strip and adapted to hold the lightning-arresters P P in place therebetween against said strip. This said mounting-plate is adapted to carry a series of sets of the protective apparatus and is preferably grounded through the iron framework of a distributing-board or the like. The usual form of supporting-plate for protective apparatus now in use is a solid iron bar of considerable thickness, about three-eighths of an inch, to one edge of which is secured a thin strip for supporting the lightning-arresters. This form of plate is very heavy and contains much unnecessary material. The strips A A of my present invention are very thin, preferably .032 of an inch, and are formed so as to take the place of both the said usual supporting-plate and strip secured thereto, thus simplifying the construction and doing away with the larger part of the material and weight of the solid-bar form. Another advantage of my strip A over the solid bar is that the latter has to be drilled wherever a hole therethrough is required, while all of the holes of my strip A may be punched. This is a considerable saving in the manufacture of same. The strips A A may be nickel-plated over the surfaces against which the lightning-arresters rest or where contact-points make contact to insure good contact with the contacting parts. Strips A A are similar, thus making the mounting-plate reversible. This ground-plate A A forms the subject-matter of my copending application for Letters Patent, Serial No. 234,401, filed November 26, 1904, which is a division of this present application.

The protective devices and spring members of the protective apparatus are mounted in a series of duplicate sets upon the ground-plate A A, each duplicate set forming a pair and the sets of each pair being mounted on opposite sides of the said plate directly opposite each other. As the duplicate sets of apparatus of the series are similar to each other, I will describe in detail one duplicate set only of the series.

On each side of the ground-plate A A is mounted a pair of springs E and G by two double-ended bolts S and T, which extend through the strips A A near the rear edge of the latter. These springs E and G are mounted flatwise on the said strips and are insulated from each other and from the said strips by suitable insulating bushings and washers R R, threaded on the bolts S and T. I preferably place a bushing D on the said bolts between the strips A A, so that when the nuts on S and T are screwed up tightly the strips A A will be rigidly held at a given distance from each other. Each spring G is provided with ears J J thereon, between which a heat-coil or thermal protector L is placed and held by the spring-pressure of the said ears, with a hole through which a contact member N freely passes and with a narrow portion O at the free end thereof, adapted to fit in a groove of a lightning-arrester P, and thereby hold same in place against the strip Q. Springs G G terminate in suitable connection-terminals Y and Z, respectively, and are preferably to be connected with the line conductors of a metallic line—as, for example, the limbs of a telephone-line. Each spring E is provided with a tongue I near its free end, adapted to engage a thermal protector L with a hole therein through which an insulating-pin H is inserted and with an opening I² at its free end, adapted to receive a contact member of a testing-plug. Springs E E terminate in suitable connection-terminals U and W, respectively, and are preferably to be connected with the conductors of a metallic circuit leading to a central-station switchboard. Between each pair of springs G and E is placed a third spring F, Fig. 1, mounted flatwise on the plate A A by the said bolts S and T and suitably insulated from the said pair of springs and ground-plate. This third spring is preferably an alarm-circuit spring, is provided with contacts M M, Fig. 6, at its free end adapted to make contact with line-spring G when depressed toward the plate A, and with a projecting contact-point N, adapted to pass through line-spring G and make contact with the ground-plate A A when the spring F is thus depressed, as shown on the right-hand side of Fig. 1. Springs F F terminate in suitable connection-terminals V and X, respectively, and are each preferably to be connected with a grounded alarm-circuit. A number of springs F F of the strip of protective apparatus may be connected in common and then connected to a single alarm-circuit in a manner well understood, so that the operation of any one of the springs thus connected will close the said alarm-circuit, and thereby operate the alarm. The circuit from a switchboard-conductor to a corresponding line conductor through the protective apparatus is from connection-terminal U, through switchboard-spring E, tongue I, thermal protector L, ears J J, line-spring G, and connection-terminal Z, or through a similar circuit on the opposite side of plate A A.

If a high-potential electric current or discharge, such as lightning, comes to the protective apparatus from a line conductor, it will pass through a connection-terminal Z or Y and a line-spring G and then jump through a lightning-arrester P from one carbon block to the other to the ground-strip Q and thence to earth, thus dissipating its energy without injuring the thermal protector L or the switchboard-circuit and apparatus connected thereto.

When an abnormally-large current with insufficient voltage to arc through the lightning-arrester, this current being generally termed a "sneak-current," traverses the circuit through a thermal protector L for a short length of time—say fifteen or twenty seconds—it causes the latter to allow the spring member I to operate the said protector L in any suitable manner, and thereby cause same to release the spring member I, which, with spring E, takes the position shown on the right of Fig. 1, due to the tension in springs E and I, and thereby opens the circuit through the thermal protector L. When spring E is thus operated, it causes the insulating-pin H to press against the alarm-spring F, and thereby depress the latter until contacts M M thereof engage the line-spring G and contact N engages the ground-strip A, thereby grounding the line-spring G and switching the abnormal current from the line to earth and closing the alarm-circuit at N to operate the alarm, which indicates that a protective device has operated. It will be seen that the switchboard-circuit is now cut off from the line-circuit, and is therefore protected from the abnormal line-current. When the protective device has cooled sufficiently (if a "self-soldering" device) or has been replaced by a new device, the spring member I may be again engaged with the said device, as shown upon the left of Fig. 1, which engagement restores the protective apparatus to its initial operative position.

I have preferably shown a thermal protector or heat-coil L of the self-soldering type which is provided with a series of teeth therearound adapted to turn upon an axis when a fusible material normally holding the teeth against rotation is softened by an abnormal current traversing the said protector; but I do not wish to limit this invention to this particular protector.

I preferably transpose certain ones of the connection-terminals to opposite sides of the mounting-plate A A by bending same, as shown at W and Z, thereby putting both switchboard-terminals U and W on one side of the said plate and both line-terminals Y and Z on the opposite side of the said plate. It has been the usual practice heretofore when it was desired to transpose the connection-terminals to connect the spring members to be transposed with respective auxiliary connection-terminals on opposite sides of the mounting-plate from the said springs either by soldering separate conductors from each spring to a corresponding terminal or through the mounting-bolts, which were properly insulated from each other and from the said plate, the latter being so thick that it was not thought to be practicable to make the transpositions as I do in my present invention. These methods necessitated many extra parts, such as terminals, insulating-bushings, and washers. In my present invention I do away with all of these extra parts by placing the mounting-strips A A considerably closer together than the ordinary thickness of said solid mounting-plates, and thereby reduce the lengths of the connection-terminals sufficiently to render it practicable to bend and arrange the said terminals as herein shown. With this arrangement and the decrease in the number of springs per set from the number of springs generally used to accomplish all of the purposes of my invention it will be seen that the construction of the apparatus is greatly simplified.

In Fig. 4 I have shown a testing-plug adapted to coöperate with the protective apparatus for testing purposes. The said plug comprises a block of insulating material $A^2$, preferably hard rubber, on opposite ends of which are mounted respective series of contact-springs $B^2$, $C^2$, and $D^2$, insulated from each other and adapted to coöperate with the protective apparatus, the springs on one end of block $A^2$ being similar to and forming pairs with the respective springs on the other end of block $A^2$. When the testing-plug is connected with the protective apparatus for testing, springs $B^2$ $B^2$ of the plug engage springs E E, respectively, of the protective apparatus in the apertures $I^2$ $I^2$ of springs E E, thereby forcing the latter apart against their tension, which tends to move them toward the ground-plate and breaking the contacts between the portions I I of springs E E and the toothed members $L^2$ $L^2$ of the thermal protectors L L, respectively, as shown in Fig. 4, after which springs $C^2$ $C^2$ engage the respective thermal protectors L L, preferably as shown. On each end of the testing-plug spring members $B^2$ and $C^2$ slightly diverge toward their free ends at the parts thereof which engage the protective apparatus when the plug is inserted for testing, and thereby tend to hold the plug in place after it has been inserted and not allow same to be easily displaced. The apertures $I^2$ $I^2$ in springs E E and the grooves in the lightning-arresters all tend to hold the plug in place against lateral displacement. Springs $D^2$ $D^2$ are loosely held to block $A^2$ at their free ends by pins $O^2$, and when the testing-plug is connected with the protective apparatus as described springs $D^2$ $D^2$ engage the lightning-arresters P P in respective grooves in the latter and rest against the end portions O O of line-springs G G, respectively, thus limiting the insertion of the plug into the protective apparatus. Conductors 1, 2, 3, 4, 5, and 6 lead from the respective springs of the test-plug to any suitable switch and testing instrument. The arrangements heretofore employed for testing protective apparatus were such that the circuit-protectors had to be removed from their supports before the test-plug could be inserted for testing or there were provided extra contact members to form normally closed socket-switches adapted to receive the testing-plug. In my present invention I do not employ any extra contact members to form switches for the test-plug nor do I remove any of the circuit-protectors from their supports in testing the several circuits through the apparatus. I simply employ the line-springs and switchboard-springs and the protective devices themselves, substantially as shown and described.

The circuits to be tested are as follows: first, from conductors 1 and 6, through springs $B^2$ $B^2$, respectively, springs E E, connection-terminals U and W, and the switchboard-circuit connected to U and W; second, from conductors 2 and 5, through springs $C^2$ $C^2$, respectively, thermal protectors L L, ears J J, springs G G, connection-terminals Z and Y, and the line-circuit connected to Z and Y; third, from conductors 3 and 4, through springs $D^2$ $D^2$, respectively, lightning-arresters P P, springs G G, connection-terminals Z and Y, and the line-circuit connected to Z and Y; fourth, from conductor 2, through spring $C^2$ on the left of Fig. 4, thermal protector L, ears J J, spring G, lightning-arrester P, spring $D^2$, and conductor 3, and, fifth, from conductor 5, through spring $C^2$ on the right of Fig. 4, thermal protector L, ears J J, spring G, lightning-arrester P, spring $D^2$, and conductor 4. It will be readily seen that this arrangement provides a simple and efficient means for testing the switchboard-circuit, the line through the heat-coils, the line direct, or either heat-coil separately and independently of each other. While I have traced out metallic circuits for the line and switchboard testing, it is evident that grounded-return or common-return circuits may be equally tested. In testing between conductors 2 and 3 or between conductors 4 and 5 the thermal protectors and their contacts with their supporting means alone are tested as in actual service. When the test-plug is withdrawn from the protective apparatus, contact-springs I I again engage the respective protectors L L, as originally, and thereby automatically restore the said apparatus to its operative condition.

In Fig. 4, on each side of the ground-plate A A, I mount an alarm-spring $F^2$ between the line-spring G and the mounting-strip A and adapt same to make contact with both the strip A and spring G when depressed. I provide an insulating-pin $H^2$, extending through the spring G, adapted to normally hold springs G and $F^2$ apart and to depress spring $F^2$ when a thermal protector operates. When the latter operation takes place, spring E is released by the protective device L, as described above, and comes in contact with the insulating-pin $H^2$, which thereupon depresses spring $F^2$, first causing contact $F^1$ thereof to make contact with the ground-strip A and then still further depressing spring $F^2$ with contact $F^1$ as a fulcrum until contact $F^3$ makes connection with line-spring G. It will be readily seen that by the operation of the thermal protector spring $F^2$ closes an alarm-circuit between contact $F^1$ and ground-strip A and connects the line-spring G to ground.

In Fig. 5 I preferably employ a common alarm-strip. (Best shown in Fig. 7.) I prefer this form of arrangement for closing an alarm-circuit over an individual spring for each set of the protective apparatus, as it does away with many separate parts and eliminates the necessity of connecting the alarm-springs together by a common conductor, as is usually done. With this arrangement I employ only two individual springs in each set of the protective apparatus for supporting the protective devices, for operating the thermal protector and controlling the several circuits, for testing purposes, as described, and for the connection-terminals, whereas it is the usual practice to employ five or six individual springs in each set of the protective apparatus for accomplishing all of these purposes. The alarm-strip $A^3$ is preferably made of a very thin strip of metal, one side of which is punched, so as to provide a series of projecting portions $T^2$ $T^2$ thereon. Each projecting portion $T^2$ is split at its free end and a portion turned up, as at $U^2$, thus providing two contact portions $V^2$ $V^2$ on the straight part of $T^2$ and a contact $U^2$ on the turned-up portion thereof. I mount one of the alarm-strips $A^3$ flatwise on each side of the ground-plate A A, preferably by bolts or rivets $S^2$, extending through the plate A A and holes $T^3$ $T^3$ of the alarm-strips, and insulate the latter from the plate A A by respective insulating-strips $R^3$ $R^3$, preferably as in Fig. 5. Each contact $U^2$ of alarm-strip $A^3$ extends freely through a hole in a line-spring $G^2$ and is normally out of contact with the latter. Contacts $V^2$ $V^2$ are also normally out of contact with ground-strip A, as shown upon the left-hand side of Fig. 5. When a thermal protector operates, it causes the switchboard-spring E to engage an insulating-pin $H^3$, which extends through the line-spring $G^2$, and thereby cause pin $H^3$ to depress a tongue portion $T^2$ of alarm-strip $A^3$, and thus cause contacts $V^2$ $V^2$ to engage the ground-strip A and contact $U^2$ to engage the line-spring $G^2$, as shown upon the right of Fig. 5. It will readily be seen that when a tongue $T^2$ of strip $A^3$ is depressed, as described, it closes a circuit between the strip $A^3$ and ground-strip A at contacts $V^2$ $V^2$, which circuit may be an alarm-circuit, and also connects its adjacent line-spring $G^2$ to ground through contact $U^2$ and contacts $V^2$ $V^2$.

While I have shown and described particular details of construction in this invention, I do not wish to limit same to such exact details, as slight modifications in certain parts of the structure would not be a departure from the scope of the invention; neither do I wish to limit myself to any particular type of thermal protector or lightning-arrester.

Having thus described my invention, what I claim as new, and desire to secure by Letters Patent, is—

1. In electric protective apparatus, the combination of a plate, a pair of springs mounted thereon, a protective device electrically connected with one said spring and normally engaged by the other, and means for grounding a spring; the said device being adapted to disengage one of the said springs therefrom under abnormal conditions, to ground the other spring.

2. In apparatus of the class specified, a ground-plate, a pair of springs mounted thereon, means for grounding a spring, and a protective device electrically connecting the said springs but adapted to operate under abnormal current conditions to disengage one of the said springs therefrom and allow same to spring toward the ground-plate and ground the other said spring.

3. In electric protective apparatus, the combination of a ground-plate, a pair of superposed springs mounted thereon and insulated from each other, means for grounding one of the springs, and a protective device adapted to disengage the outer spring therefrom and cause same to operate and thereby ground only the inner spring of the pair, under abnormal circuit conditions.

4. In electric protective apparatus, a ground-plate, a pair of superposed springs mounted thereon, a thermal protector mounted on the inner spring of the pair, the said protector and springs being normally in a series circuit, and means operated by the outer spring when disengaged from the protector and allowed to spring toward the inner spring, to ground only the latter spring of the pair.

5. In electric protective apparatus, the combination of a sheet-metal mounting-plate, mounting-bolts extending through said plate near one edge thereof, a pair of springs for each side of said plate and mounted thereon by said bolts, the said springs being line and switchboard terminals, respectively, a protective device for each pair of springs and adapted to be operated thereby, and a line-terminal and a switchboard-terminal being crossed over to respective opposite sides of the mounting-plate, past one edge thereof, for the purpose of arranging like terminals together, substantially as described.

6. In electric protective apparatus, the combination of a mounting-plate comprising thin strips of sheet metal secured to each other at one edge and held a slight distance apart over the remainder of the plate, a series of mounting-bolts extending through said plate near the open edge thereof, suitable distance-pieces placed between the sheet-metal strips at the said bolts, series of spring members mounted upon opposite sides of said plate by said bolts, the said springs being line and switchboard terminals, suitable protective devices for the said springs, and certain ones of the line and switchboard terminals being crossed over to opposite sides of the mounting-plate, past one edge thereof, for the purpose of arranging like terminals together, substantially as described.

7. In protective apparatus for electric circuits, a ground-plate, pairs of springs mounted upon one side of said plate and suitably insulated from each other, a protective device for each pair of springs and normally connected therewith, a common strip mounted on said plate between the said pairs of springs and the ground-plate, and suitably insulated, and means whereby the operation of a protective device causes the said common strip to connect a spring of one pair with the ground-plate.

8. In protective apparatus for electric circuits, a ground-plate, a series of pairs of springs suitably mounted upon one side of said plate and insulated therefrom and from each other, a protective device for each pair of springs, mounted on one spring of the pair and adapted to be engaged by the other, and a common strip suitably mounted and provided with a series of tongue portions any one of which is adapted to connect a spring of a pair with the ground-plate when a protective device operates.

9. In apparatus of the class specified, a ground-plate, a series of line-springs mounted thereon and insulated therefrom, a series of switchboard-springs also mounted thereon and insulated from the line-springs, a protective device for each pair of springs and mounted on the line-spring of the pair, a series of lightning-arresters placed between the free ends of the line-springs and the ground-plate, a common conducting-strip mounted flatwise on the ground-plate and provided with a series of contact portions thereon, and means whereby, when a protective device operates, its corresponding switchboard-spring opens the circuit and causes a contact portion of said common strip to conductively connect the adjacent line-spring with the ground-plate, substantially as described.

10. In protective apparatus for electric circuits, a ground-plate, a common alarm-strip mounted thereon, a series of sets of protective apparatus also mounted thereon, and means whereby the operation of any one of the sets of protective apparatus brings a contact portion of the alarm-strip in contact with the ground-plate and thereby closes an alarm-circuit.

11. In protective apparatus for electric circuits, a sheet-metal ground-plate, a common alarm-strip for each side of said plate, mounted thereon and insulated therefrom, a series of sets of protective apparatus for each side of the said plate and mounted thereon outside of the respective alarm-strips, and means whereby the operation of a set of the protective apparatus causes the corresponding alarm-strip to close an alarm-circuit between itself and the ground-plate and ground a spring of the set.

12. In electric protective apparatus, the combination of a ground-plate, a pair of springs mounted thereon, a thermal protector mounted on one said spring and adapted to be engaged by the other, an alarm-spring, and means included by the protector whereby the operation of the latter disengages one of the said springs therefrom and allows same to operate and cause the alarm-spring to close an alarm-circuit and ground the other said spring of the pair.

13. In electric protective apparatus, the combination of a ground-plate, a pair of springs mounted thereon, a thermal protector mounted on one said spring and adapted to be engaged by the other, an alarm-spring mounted between the pair of springs and the ground-plate, and means included by the protector whereby the operation of the latter disengages one of the said springs therefrom and allows same to operate and cause the alarm-spring to make contact with the ground-plate and the other spring of the pair, thereby closing an alarm-circuit and grounding the last-mentioned spring of the pair, substantially as described.

14. In electric protective apparatus, the combination of a supporting-plate, a pair of springs mounted thereon, a thermal protector conductively mounted on one said spring and adapted to be engaged by the other, and means included by the latter said spring with which a test-plug coöperates to disengage said spring from the protector while testing.

15. In electric protective apparatus, the combination of a mounting-plate, a pair of spring members mounted thereon, a thermal protector conductively mounted on one said spring and adapted to be engaged by the other, and a testing means adapted to engage the protective device and the last-mentioned spring and in so doing to open the circuit between the latter and the protective device, for testing.

16. In electric protective apparatus, the combination of a mounting-plate, a pair of superposed springs mounted thereon, a thermal protector mounted on one said spring and normally engaged by the other, a hole in the latter said spring adapted to receive a test-plug and thereby open the circuit through the protector, and means adapted to engage the protector for testing.

17. In electric protective apparatus, the combination of a mounting-plate, a pair of spring members for each side thereof and mounted thereon, a thermal protector for each pair of springs, conductively mounted on one spring of its pair and adapted to be engaged by the other spring of the pair, and means included by the latter said springs with which a test-plug coöperates to disengage said springs from the respective protectors for testing.

18. In electric protective apparatus, the combination of a mounting-plate, a pair of springs for opposite sides thereof and mounted thereon, a thermal protector for each pair of springs, each being conductively mounted on one spring and adapted to be engaged by another, and a testing means adapted to engage the protective devices and the said engaging springs of the pairs and in so doing to open the circuits between the latter said springs and their respective protective devices, substantially as described.

19. In electric protective apparatus, the combination with a mounting-plate, of a pair of superposed springs for opposite sides thereof and mounted thereon, a thermal protector mounted on one said spring of each pair and normally engaged by the other, a hole in the engaging spring of each pair adapted to receive a test-plug and thereby open the circuits through the protectors, and means adapted to engage the protectors also, for testing, substantially as described.

20. In apparatus of the class specified, the combination of a mounting-strip, a protective device for each side of said strip and suitably mounted, a spring for each said device and normally engaging same, and an aperture in each said spring through which contact members of a testing-plug are inserted for testing, the said insertion causing the said springs to disengage the said devices, for purposes substantially as described.

21. In apparatus of the class specified, the combination of a mounting-plate, a protective device for each side thereof and suitably mounted, an engaging means for each said device and normally engaging same, an aperture in each engaging means, and contact members of a test-plug adapted to be inserted through said apertures, and to engage said devices, respectively, and by such connection to disengage the said engaging means from their respective protective devices, for purposes substantially as described.

22. In protective apparatus for electric circuits, the combination of a ground-plate comprising parallel sheet-metal strips properly secured to and spaced from each other over respective portions of same, a common alarm-strip for each side of said plate and insulatively secured thereto, a series of projecting contact members on each alarm-strip, a series of pairs of superposed springs for each side of the ground-plate, mounted flatwise thereon and insulated therefrom and from each other, mounting-bolts for the said springs and extending through the rear edge of the ground-plate, lightning-arresters inserted between the respective inner springs of the pairs and the ground-plate, heat-coils conductively mounted on the respective inner springs of the pairs, a contact portion on each outer spring of the pairs and adapted to engage the respective heat-coils, an aperture in each outer spring of the pairs and adapted to receive respective contact members of a testing-plug, an inner spring and an opposite outer spring of each oppositely-mounted pairs of springs being crossed over to opposite sides of the ground-plate through space at the rear of same, for the purpose of arranging like connection-terminals on the same side of the ground-plate, an insulating-pin extending through each inner spring of the pairs, through the agency of which the said outer springs depress the respective projecting contact members of the alarm-strips when the respective heat-coils operate, the operation of a heat-coil allowing its said outer spring to release itself and thereby open the circuit through the heat-coil, close an alarm-circuit and ground the inner spring of the pair, and contact members of a testing-plug adapted to engage the respective apertures in the outer springs of an oppositely-mounted pair of the protective apparatus, and the heat-coils of same, respectively, and to disengage the said outer springs from the respective heat-coils when thus inserted, substantially as described.

23. In apparatus of the class specified, the combination of a mounting-plate, a pair of springs mounted thereon, a thermal protector conductively mounted on one said spring and engaged by the other, and means with which a test-plug coöperates to disengage the said engaging spring from the protector for testing.

24. In apparatus of the class specified, a thermal protector, means for engaging the protector and tending to operate same, and means for disengaging the said engaging means from the protector for testing purposes.

25. In apparatus of the class specified, a thermal protector conductively mounted on a suitable support, a conducting member normally engaging the protector and in circuit with the latter and said support, and means for opening the said circuit for testing the apparatus.

26. In combination, a thermal protector, a conductive portion engaging the protector and adapted to operate under abnormal conditions, and means whereby the said conductive portion may be disengaged from the protector for testing the apparatus or through the apparatus.

27. In combination, a thermal protector, a spring member adapted to engage a portion of the protector and to operate upon an abnormal current in the latter, and means for disengaging the spring member from the protector to open the circuit through same for testing.

28. In combination, a thermal protector for electric circuits, a spring member adapted to engage a portion of the protector and to operate to control a circuit when the protector gives way, and means for disengaging the spring member from the protector and for engaging the protector and spring member for testing, substantially as described.

29. In apparatus of the class specified, a pair of spring members, a thermal protector conductively mounted on one spring member and normally engaged by the other, and means for grounding a spring member; abnormal conditions in the protector allowing one spring member to release itself from the protector and operate to ground the other spring member.

30. In apparatus of the class specified, a thermal protector, a conducting member to which the thermal protector is mounted, a grounding means, and a spring member adapted to operate and operate the protector to disengage itself therefrom, under abnormal conditions, and by such operation cause the said conducting member to be grounded.

31. In apparatus of the class specified, a supporting-plate, a thermal protector suitably mounted in a fixed position relatively to the plate, and a spring member normally engaging the protector but adapted to disengage itself therefrom, under abnormal conditions, and operate toward the supporting-plate to control a circuit.

32. In electric protective apparatus, the combination of a mounting-plate, a pair of spring members for each side of the plate and suitably mounted thereon, the said springs being line and switchboard terminals, respectively, a protective device for each pair of springs and adapted to coöperate therewith, and a line-terminal and a switchboard-terminal being crossed over to respective opposite sides of the mounting-plate past one edge thereof, for the purpose of arranging like terminals together, substantially as described.

33. In electric protective apparatus, the combination of a mounting-plate, a pair of spring members for each side of the plate, suitably mounted thereon and one spring of each pair having an end portion thereof crossed over to the opposite side of the plate past the edge thereof, and a protective device for each pair of springs and adapted to coöperate therewith, for purposes substantially as described.

34. In electric protective apparatus, a plate, conducting members for each side of the plate, mounted thereon and a conducting member of each side of the plate having an end portion thereof crossed over to respective opposite sides of the plate to form terminals for circuit-conductors, and a protective device for each side of the plate and arranged to coöperate with the said conducting members in the use of the apparatus, substantially as described.

35. In electric protective apparatus, a ground-plate, a pair of springs mounted thereon, a protective device rigidly mounted on one said spring in a fixed position relatively to the ground-plate, and normally engaged by the other, and an alarm-spring adapted to be operated by the said engaging spring becoming disengaged from the protective device, to control an alarm-circuit.

36. In electric protective apparatus, a ground-plate, a conducting member and a spring member mounted on the ground-plate, a protective device mounted on the said conducting member in a fixed position relatively to the ground-plate, and engaged by the said spring, and means for closing an alarm-circuit actuated by the said spring becoming disengaged from the protective device.

37. In electric protective apparatus, a ground-plate, a pair of superposed springs suitably mounted on the said plate, a protective device mounted on the inner spring of the pair and engaged by the outer spring, and an alarm-spring interposed between the pair of springs and the ground-plate and brought in contact with the ground-plate by the outer spring of the pair when same is released from the protective device, to close an alarm-circuit.

38. In electric protective apparatus, a ground-plate, a pair of superposed springs suitably mounted on the said plate, a protective device rigidly mounted on the inner spring of the pair and normally engaged by the outer spring, and an alarm-spring interposed between the pair of springs and the ground-plate and adapted to be operated by the outer spring of the pair when same is disengaged from the protective device, to close an alarm-circuit and ground the inner spring of the pair.

39. In electric protective apparatus, a mounting-plate, a pair of springs mounted thereon, a thermal protector mounted on the inner spring of the pair and normally engaged by the outer spring, the latter spring being adapted to release itself from the protector and operate toward the mounting-plate under abnormal conditions, means for reëngaging the engaging spring with the protector to reset the apparatus, and means for springing the said engaging spring away from the mounting-plate to disengage it from the protector for testing purposes.

40. In electric protective apparatus, a mounting-plate, a thermal protector suitably mounted, a spring member mounted on the said plate and adapted to engage the protector, abnormal conditions in the latter allowing same to release the said spring therefrom, means for reëngaging the latter with the protector to reset the device, and means for disengaging the said spring from the protector to test the apparatus.

41. In combination, a thermal-protector adapted to be included in a circuit, means for engaging the protector and adapted to operate under abnormal conditions to control a circuit, and means for disengaging said engaging means from the protector for testing purposes.

42. In combination, a thermal protector adapted to be included in a circuit, a spring member for engaging the protector and adapted to disengage itself therefrom and operate in one direction to open the circuit through the device, upon an abnormal current therein, means for reëngaging the spring member with the protector to reset the apparatus, and means for operating the spring member in the opposite direction to disengage same from the protector and open the circuit through the latter for testing.

As inventor of the foregoing I hereunto subscribe my name, in the presence of two witnesses, this 7th day of July, A. D. 1904.

FREDERICK R. PARKER.

Witnesses:
 JNO. F. TOMPKINS,
 F. W. PARDEE.